F. STRICKLAND.
SAW GUMMER.
APPLICATION FILED MAY 27, 1914. RENEWED JUNE 24, 1916.
1,194,092.
Patented Aug. 8, 1916.
5 SHEETS—SHEET 1.
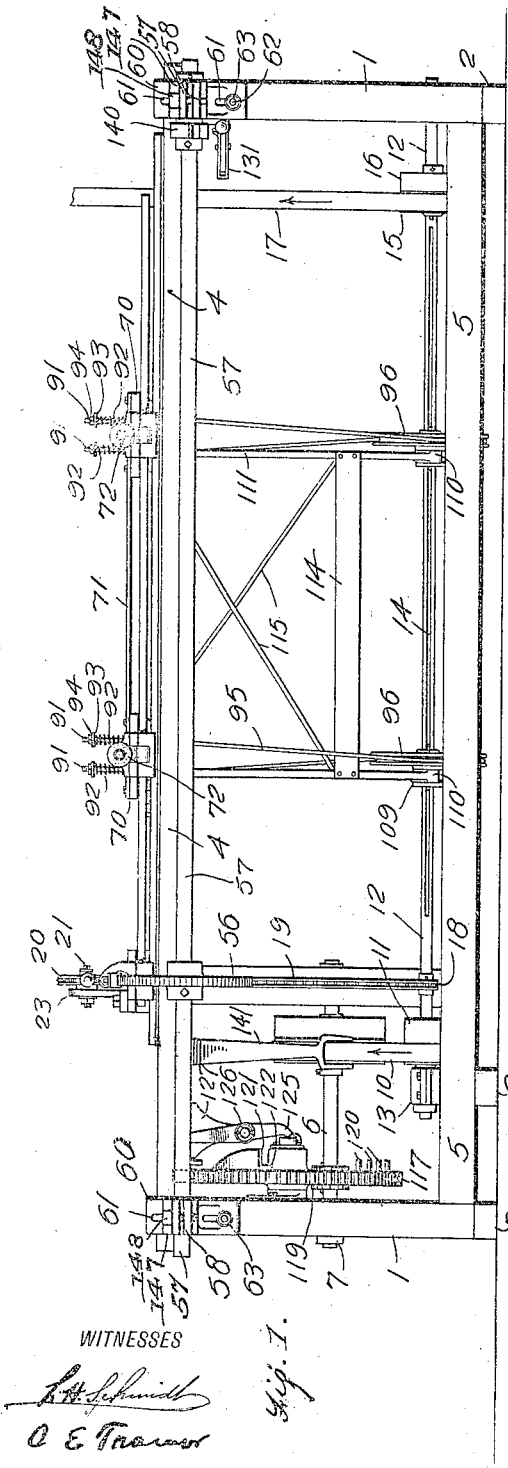
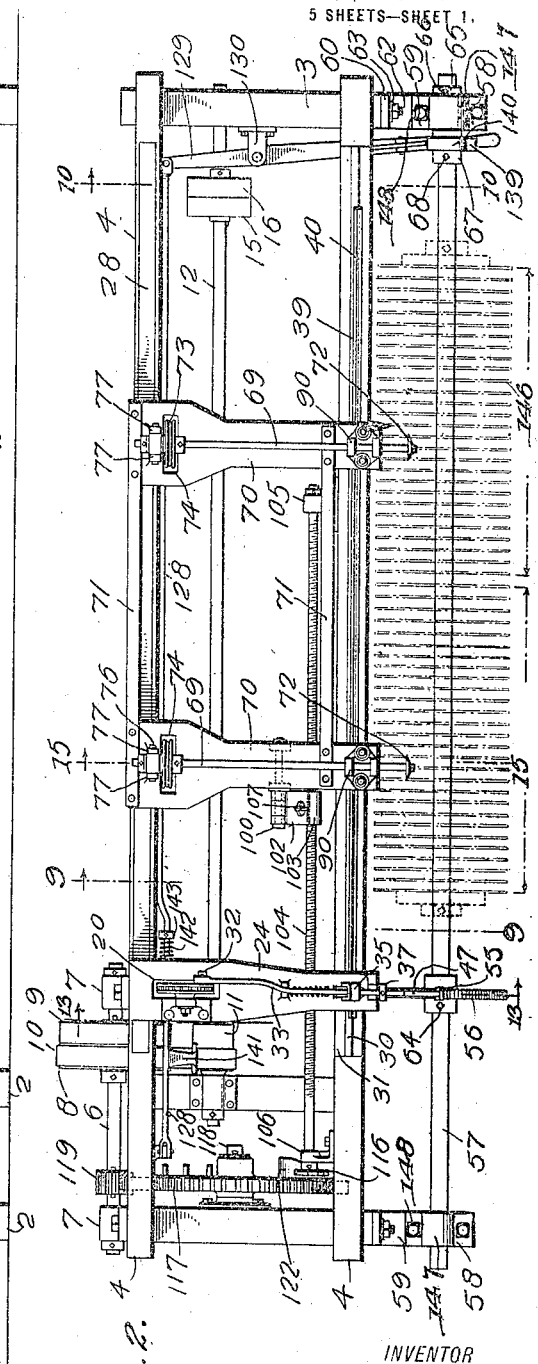
WITNESSES
INVENTOR
FRED STRICKLAND,
BY Munn & Co.
ATTORNEYS F. STRICKLAND.
SAW GUMMER.
APPLICATION FILED MAY 27, 1914. RENEWED JUNE 24, 1916.

1,194,092.

Patented Aug. 8, 1916.
5 SHEETS—SHEET 2.

WITNESSES

INVENTOR
FRED STRICKLAND,
BY
ATTORNEYS

F. STRICKLAND.
SAW GUMMER.
APPLICATION FILED MAY 27, 1914. RENEWED JUNE 24, 1916.
1,194,092.
Patented Aug. 8, 1916.
5 SHEETS—SHEET 3.
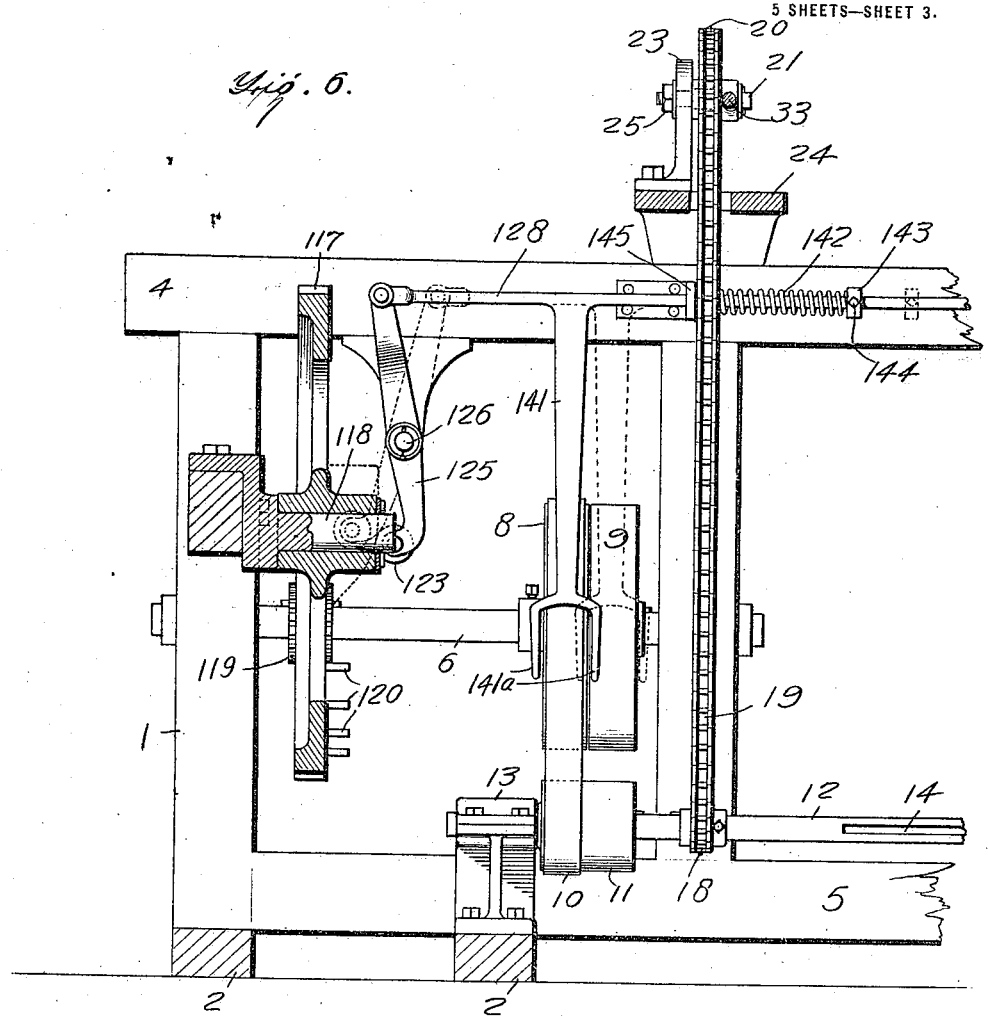
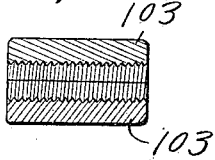
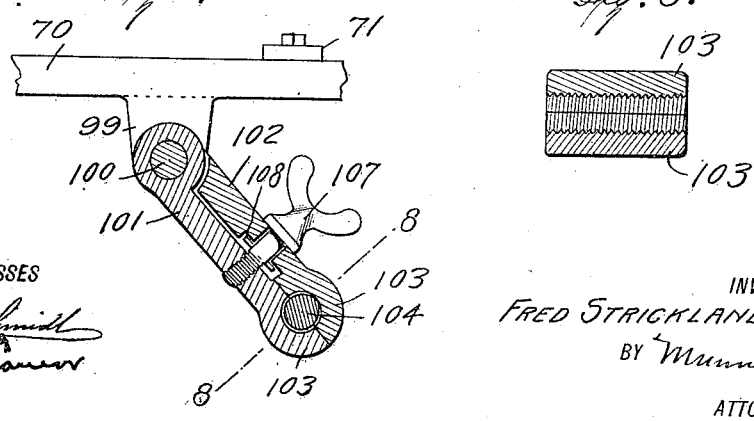
WITNESSES
INVENTOR
FRED STRICKLAND,
BY
ATTORNEYS

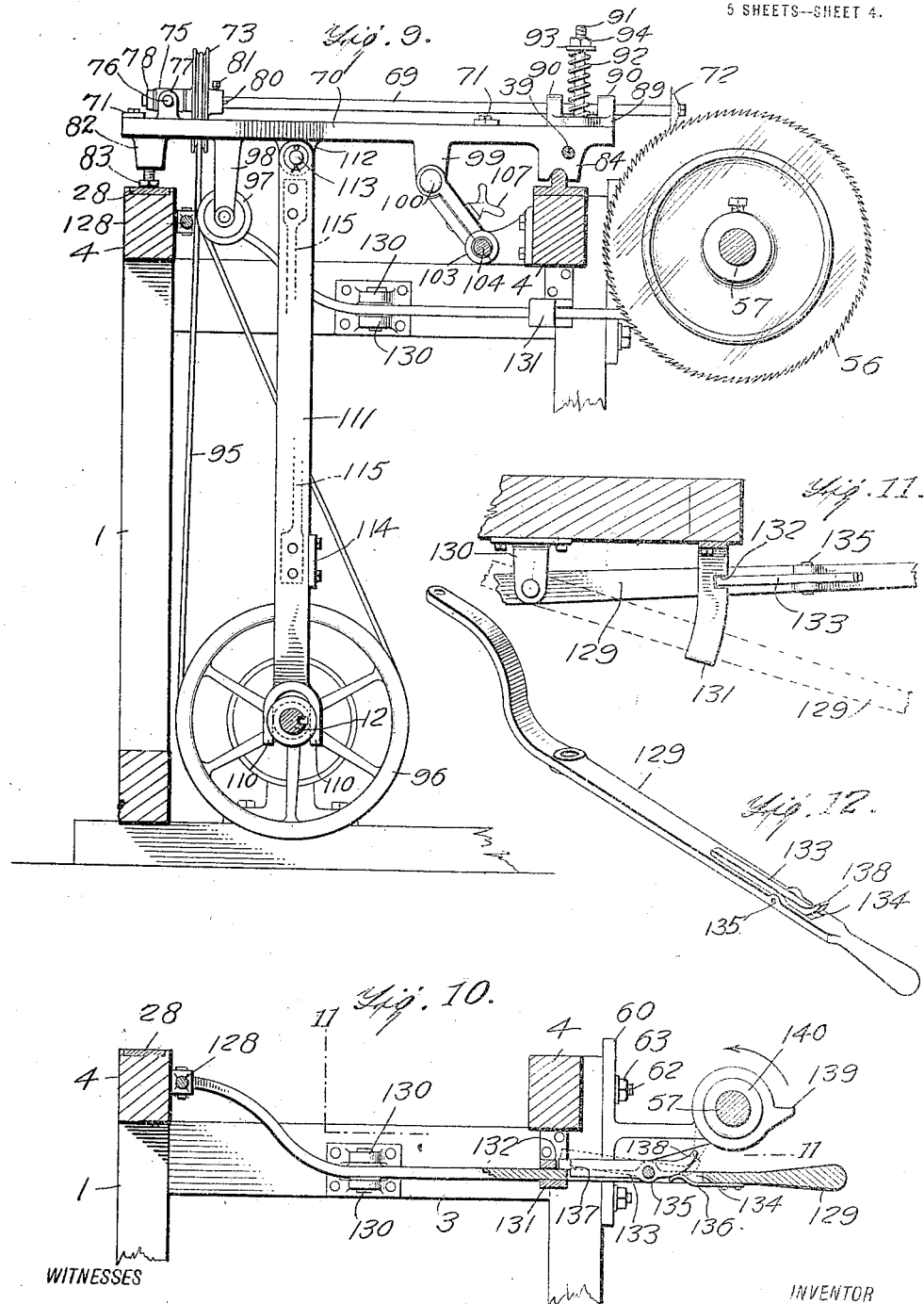

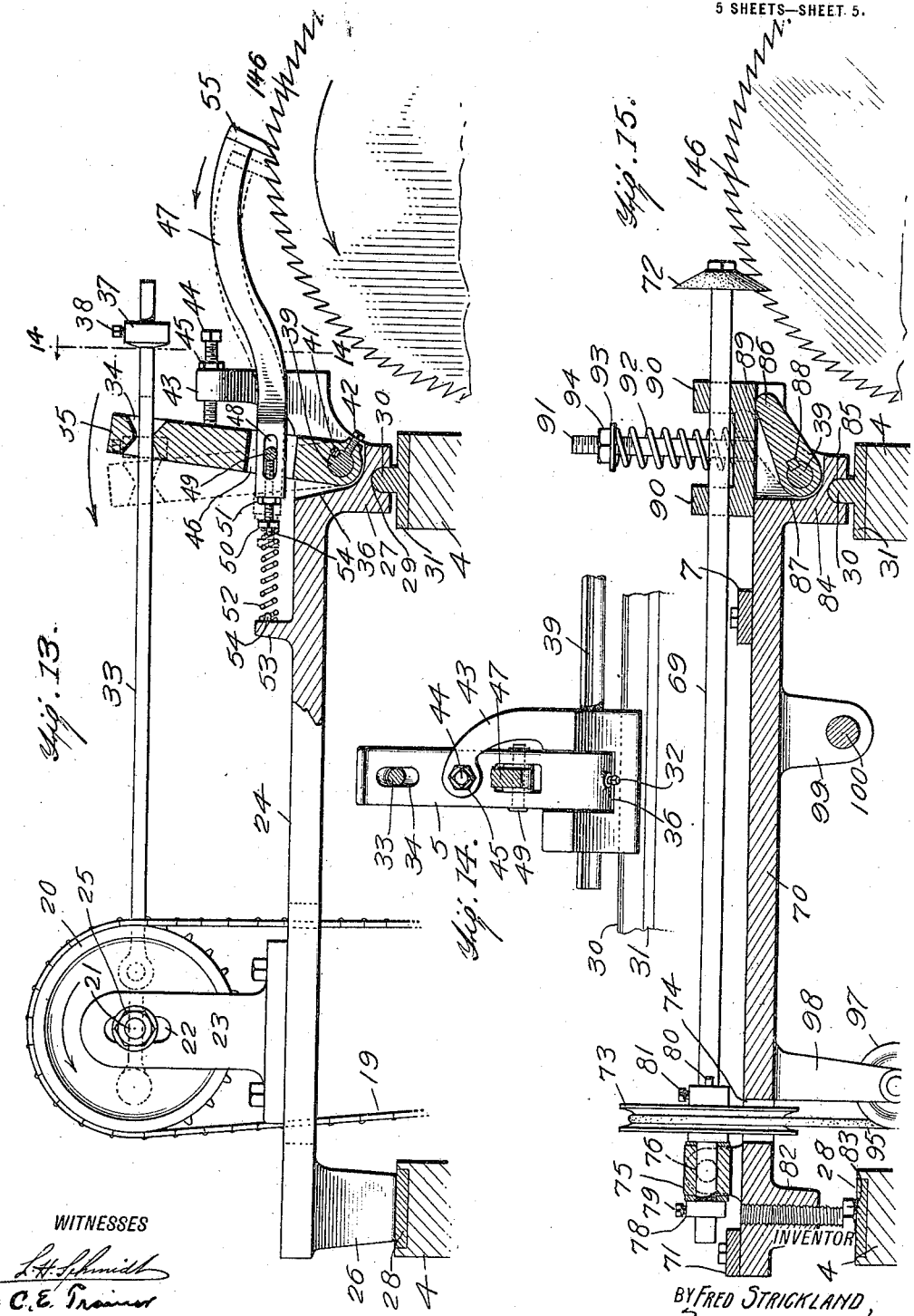

UNITED STATES PATENT OFFICE.

FRED STRICKLAND, OF ANDERSON, SOUTH CAROLINA.

SAW-GUMMER.

1,194,092. Specification of Letters Patent. Patented Aug. 8, 1916.

Application filed May 27, 1914, Serial No. 841,240. Renewed June 24, 1916. Serial No. 105,709.

*To all whom it may concern:*

Be it known that I, FRED STRICKLAND, a citizen of the United States, and a resident of Anderson, in the county of Anderson and State of South Carolina, have made certain new and useful Improvements in Saw-Gummers, of which the following is a specification.

My invention is an improvement in saw gummers, and has for its object to provide a device of the character specified, having a mandrel for supporting a series of saws, and having gumming mechanism mounted on a carriage, and wherein mechanism is provided for operating the gummers and for moving the saws tooth by tooth to permit each tooth to be gummed, and wherein other mechanism is provided operated by the completion of a rotation of the saws, for connecting normally inoperative moving mechanism for the gummers to the gummers, for moving the gummers to the succeeding saws, and wherein other mechanism is provided in connection with the moving mechanism of the gummers for releasing the moving mechanism after the gummers have been moved.

A further object is to provide gumming wheels and shafts to which the gumming wheels are connected, and a carriage for supporting the shafts, and for arranging the shafts on the tables in such manner that when the saws are advanced, the gummer wheels will be lifted out of engagement with the saws.

Figure 3:
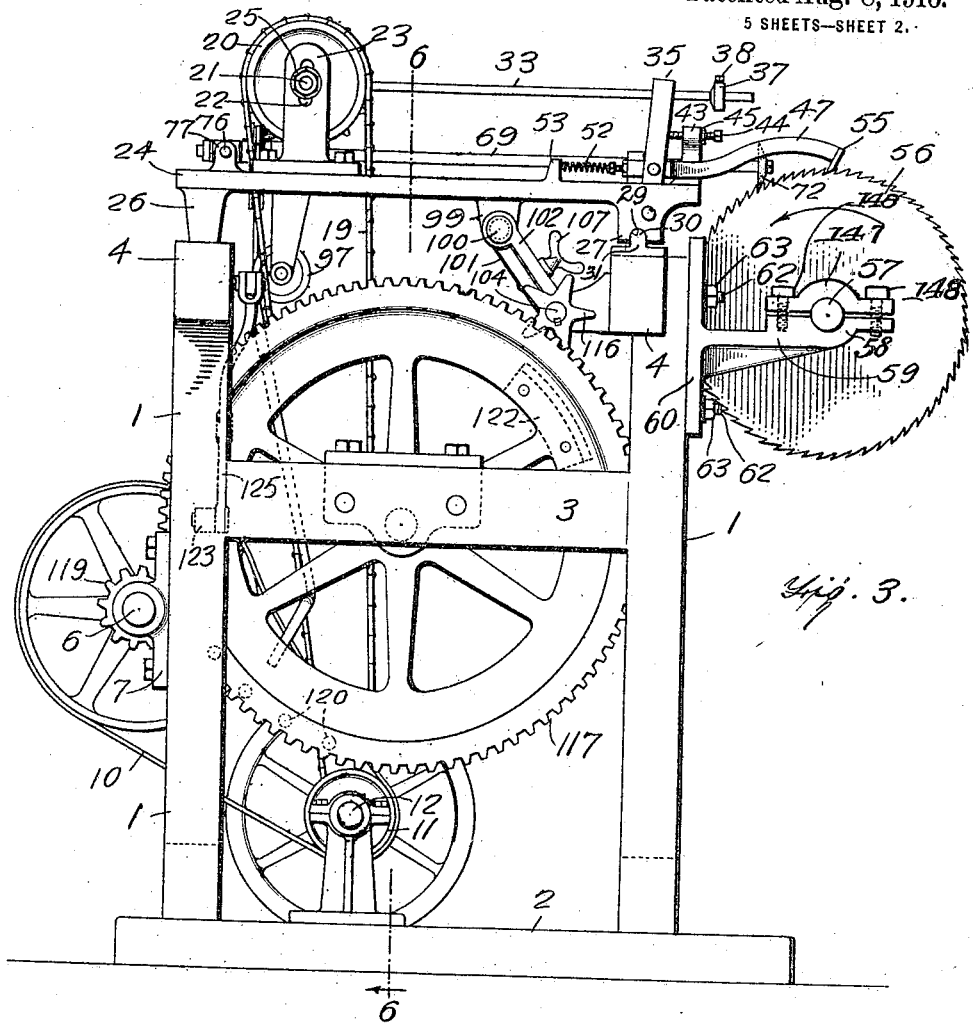
Figure 4:
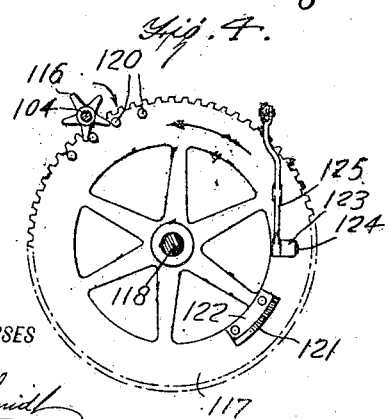
Figure 5:
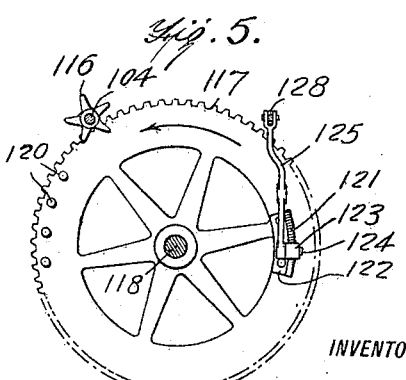

In the drawings: Figure 1 is a side view of the improved gummer, Fig. 2 is a top plan view, Fig. 3 is an end view, Figs. 4 and 5 are diagrammatic end views of the moving mechanism for the carriage of the gumming devices, Fig. 6 is a section on the line 6—6 of Fig. 3, Fig. 7 is a vertical section through the connection between the gumming wheel supporting carriage and its moving means, Fig. 8 is a section on the line 8—8 of Fig. 7, Figs. 9, 10 and 15 are sections of Fig. 2 on the lines 9—9, 10—10, and 15—15, respectively, each looking in the direction of the arrow adjacent to the line, Fig. 11 is a section on the line 11—11 of Fig. 10, Fig. 12 is a perspective view of the latch lever, Fig. 13 is a section on the line 13—13 of Fig. 2, and Fig. 14 is a section on the line 14—14 of Fig. 13 looking in the direction of the arrow adjacent to the line.

The present embodiment of the invention comprises a supporting frame consisting of uprights 1, extending upwardly from base bars 2, and the uprights are connected near their upper ends by cross bars 3. Upper and lower longitudinally extending bars 4 and 5 respectively connect the adjacent uprights, and a shaft 6 is journaled in bearings 7 secured to the uprights at the rear of the frame.

Fast and loose pulleys 8 and 9 are secured to the shaft, and a belt 10 connects one of the pulleys to a wide pulley 11 on a drive shaft 12 journaled parallel with the shaft 6 in sectional bearings 13 supported on the base bars 2, the said shaft 12 extending approximately the full length of the frame. It will be noted that the shaft 12 is provided with a keyway 14, which extends from near one end to near the other, and fast and loose pulleys 15 and 16 are arranged on the shaft near the opposite end from the wide pulley 11.

The pulley 15 which is the fast pulley and is keyed to the shaft 12, may be connected to a suitable source of power by means of a belt 17. A sprocket wheel 18 is keyed to the shaft 12 near the wide pulley 11, and a sprocket chain 19 connects the sprocket wheel to a sprocket wheel 20, secured to a stub shaft 21, which is held adjustable in a slot 22 in a bracket 23, which extends upwardly from a plate or table 24 mounted above the frame.

The shaft 21 is held adjustable in the slot 22 of the arm 23, by means of a nut 25, and it will be evident that by loosening the nut the wheel 20 may be adjusted vertically with respect to the plate or table 24. The plate 24 is provided at each end with depending lugs 26 and 27 respectively, the lug 26 resting upon a facing plate or track plate 28, which is countersunk in the upper face of the adjacent longitudinal bar 4.

The lug 27 has a groove 29 in its under face, which is engaged by a rib 30, extending upwardly from a facing plate 31, secured to the upper face of the opposite longitudinal bar 4. The wheel 20 is provided with a wrist pin 32, to which is connected one end of a pitman 33, and the other end of the pitman extends through an opening 34 in the upper end of an arm 35 which is pivoted in a recess 36 in the upper face of the plate 24 at the lug 27, A collar 37 is arranged on the pitman on the opposite side of the arm 35 from the wheel 20, and a set screw 38 is threaded through the collar for engaging the pitman to fix the collar with respect thereto. It will be noted from an inspection of Fig. 13, that the opening 34 for the pitman is tapered in each direction from the center, so that the arm may be oscillated by the pitman, without the pitman binding in the opening.

The arm 34 has an opening in its lower end for receiving a rod 39 which extends longitudinally of the frame above one of the longitudinal bars 4, and the rod is provided with a longitudinally extending keyway 40. The arm is keyed to the rod by means of a key 41, and a set screw 42 is threaded through the arm into engagement with the rod, to prevent longitudinal movement of the arm with respect to the rod. The key prevents angular movement of the arm with respect to the rod.

The plate 24 is provided at the end adjacent to the arm, and on the outer side of the arm, with an upstanding arm 43, and a set screw 44 is threaded through the arm, the inner end of the set screw providing a stop for limiting the forward movement of the arm. A lock nut 45 is threaded on to the set screw for holding it in adjusted position, and the arm is provided with a transverse slot 46, extending in the same direction as the opening 34, and between the opening 34 and the rod 39.

A curved arm 47 is arranged within the opening 46, and the said arm has a longitudinal slot 48 within the opening 46. A pin 49 passes through the arm and the slot 48, thus connecting the arm 47 to the arm 35 with a lost motion connection. A set screw 50 is threaded through the inner end of the arm 47 into engagement with the pin 49, and a lock nut 51 is provided for holding the set screw in adjusted position. A coil spring 52 is arranged between the head of the set screw 50 and a lug 53 on the plate or table the spring acting normally to press the arm 47 outward away from the table. The spring is held in place by pins 54 on the lug 53 and on the head of the set screw, the pins engaging within the ends of the spring.

The outer end of the arm 47 is provided with a pawl 55, for engaging the teeth of a ratchet wheel 56, secured to a mandrel 57, which is held in open bearings 58, on bracket arms 59 extending laterally from the uprights 1. The bracket arms 59 are integral with plates 60, the arms extending laterally from the plates intermediate the ends thereof, and the plates have vertically extending slots 61, through which extend bolts or threaded stems 62 from the uprights, and each stem is engaged by a nut 63, to hold the adjacent plate to the uprights. By loosening the nuts 63, it will be evident that the plates 60 may be moved vertically, to raise or lower the mandrel 57.

The ratchet wheel 56 is held to the mandrel by means of a set screw 64, and at the opposite end from the ratchet wheel a collar 65 is held in the mandrel outside the adjacent bearing 58, by means of a set screw 66. Another collar 67 is held on the mandrel on the inner side of the bearing by means of a set screw 68. A plurality of gumming devices is provided, each consisting of a shaft 69, supported by a plate or table 70 extending transversely of the frame, and supported by the plate 28 and rib 30 of the plate 31 before mentioned.

The plates 70 are connected together by straps 71 at their ends, and it will be noticed that at the end adjacent to the plate 28 the said plates 70 are enlarged laterally. A gumming wheel 72 is secured to the outer end of each of the shafts 69, and a pulley 73 is secured to each of the shafts adjacent to the inner end thereof, each of the tables 70 being slotted transversely at the pulley 73, as indicated at 74. The shaft 69 is held in a bearing sleeve 75 at the inner end, and the sleeve is provided with oppositely extending trunnions or journal pins 76, which are journaled in bearing lugs 77 extending upwardly in spaced relation from the inner end of the plate or table 70.

A collar 78 is arranged on each shaft in rear of the bearing sleeve 75, and each collar is held in fixed position by a set screw 79. The pulleys 73 are keyed to the shaft, as indicated at 80, and are also held to the shaft by set screws 81, which pass through the hubs of the pulleys. At its rear end each plate or table 70 is provided with a depending lug 82, each lug having a vertical threaded opening, and a set screw 83 is threaded through each opening from below upward, the head of the screw resting on the plate 28. At the front end each plate 70 is provided with a depending lug 84 having a transverse groove 85 for receiving the rib 30 of the plate 31.

A radial lug 86 is splined to the rod 39 in a recess 87 in the upper face of the table and in the lug 84, by means of a key 88, and the free end of the lug is adapted to engage the under face of a bearing plate 89 arranged above the recess 87.

Each of the bearing plates 89 is provided with a pair of upstanding bearing lugs 90 in which the adjacent shaft 69 is journaled, the said shaft extending transversely of the plate. Each of the bearing plates 89 is provided at its opposite ends with openings, through which extend the threaded stems 91, the said stems extending some distance above the bearing lugs 90.

A coil spring 92 encircles each of the stems between the adjacent end of the plate 89 and a washer 93 held in adjusted position on the stem by means of a nut 94. The springs 92 permit a limited upward movement of the bearing plates 89, and of the front ends of the shafts 69, but the springs 92 immediately return the bearing plates to their original position. A belt 95 connects each pulley 73 with a pulley 96 on the shaft 12 before mentioned, and one run of each belt is engaged by a pulley 97 journaled in arms 98 which depend from the under face of the plate or table 70. The pulley 97 engages the front run of the belt, and forces the belt to pass over the pulley 73 properly.

The plate or table 70 adjacent to the plate 24 is provided intermediate the lugs 82 and 84, with a pair of depending lugs 99. A pin 100 is held in the pair of lugs transversely of the table and a pair of arms 101 and 102 is journaled on the pin transversely of the table.

Each of the arms carries at the end remote from the pin 100 one of the sections 103 of a nut, the said sections being similar, and co-operating to form a complete sleeve nut, as shown in Figs. 7 and 8. The nut sections embrace a threaded rod 104, which is supported by bearings 105 and 106 at its ends, the said rod having a plain portion at each end for engaging the bearing. The nut sections are clamped onto the rod by means of a set screw 107, the said set screw being journaled in an opening in the arm 102, and threaded into an opening in the arm 101.

A pin 108 is passed transversely of the set screw intermediate its plain and threaded portions, for preventing disengagement of the set screw from the arm 102. It will be evident that when the rod 104 is rotated, the plates or tables 70 will be moved longitudinally of the arm, depending upon the direction of rotation of the rod.

The plates 70 and their connections 71 constitute a carriage, which carries two gumming shafts 69, and the complete carriage is moved longitudinally of the frame by means of the sleeve nut 103 and the rod 104. Since the carriage above mentioned moves longitudinally of the frame, a slidable connection between the shaft 12 and the shaft 69 must be provided. This connection is made by means of the wheels or pulleys 96. Each of the pulleys 96 is slidable on the shaft, but keyed thereto, and each of the said pulleys is provided with a hub 109 having an annular groove, which is engaged by the arms 110 of a fork on the lower end of an arm 111 connected to the adjacent plate 70. Each of the arms 111 is pivoted to a lug 112 depending from the under face of the plate, by means of a pin 113. The arms 111 are connected by a plate 114 just above the wheels 96, and diagonal braces 115 are arranged between the opposite ends of the arms. The arms 111 are thus rigidly braced against movement laterally of the plates 70, while at the same time the plates 70 may be moved longitudinally with respect to the arms, the arms swinging on the pivot pins 113. When the carriage constituted by the plates 70 and their connections moves longitudinally of the frame, the pulleys 96 are carried therewith, so that the driving connection by means of the belts 95 travels with the carriage, and the shafts 69 will be driven regardless of their position on the frame.

The rod 104 is provided at the end adjacent to the plate 24 with a star wheel 116, and this wheel is keyed to the shaft, as shown in Fig. 3. The wheel is provided with five arms, and a gear wheel 117 is secured to a stub shaft 118 extending inwardly from the adjacent cross bars 3. The gear wheel is driven by a pinion 119 on the shaft 6 before mentioned and the gear wheel is provided on the face adjacent to the star wheel with a series of four pins 120, the said pins extending laterally inward, and being adapted to engage the arms of the star wheel to impart a series of partial rotations to the wheel once during each complete rotation of the gear wheel. The gear wheel is also provided on the face adjacent to the pins 120 with an arc-shaped cam 121 the said cam extending laterally from a plate 122 secured to the face of the wheel. When the gear wheel 117 is rotating in the direction of the arrows in Figs. 4 and 5, the lower end of the cam on the wheel is moved forwardly, and the cam is adapted to engage a roller 123 journaled on a journal pin 124 extending laterally from one end of a lever 125 pivoted intermediate its ends, as indicated at 126 to a depending lug 127 on the frame.

A link 128 connects the opposite end of the lever from the roller with one end of a lever 129 pivoted intermediate its ends to the frame at the opposite end from the lever 125. The lever 129 is pivoted between a pair of bearing lugs 130 extending inwardly from a cross bar 3 of the frame, and an arc-shaped guard 131 is arranged over the lever at the opposite end from the link 128. The guard is provided with a single notch 132 and a latch lever 133 is pivoted intermediate its ends in a slot 134 extending longitudinally of the lever adjacent to the guard, by means of a pin 135, and the latch is adapted to engage the notch, to hold the lever in adjusted position.

A spring 136 engages the opposite end of the lever from the notch, and presses the said end upward, to hold the lever in engagement with the notch. The notch 132 is in the upper portion of the guard, and the end of the lever adjacent to the notch is notched or rabbeted, as indicated at 137, so that when the lever engages the notch, it is prevented from further downward movement at the said end by the engagement of the rabbeted portion of the latch lever with the lever itself.

The end of the lever remote from the notch is bent laterally upward, as indicated at 138, and the said end is adapted to be engaged by a radial lug 139 on a sleeve 140 secured to the mandrel 57, once during each complete rotation of the mandrel. The cam is held in place on the mandrel by the collar 67, and whenever the tooth or cam 139 engages the upturned end of the latch lever, as indicated in dotted lines in Fig. 10, the latch lever will be removed to release the said lever from the notch of the guard.

The link 128 is provided with a depending arm 141 at the belt 10, the arm having a fork whose arms 141ª engage opposite sides of the belt, to move the said belt from the loose pulley 8 to the fast pulley 9 of the shaft 6. A coil spring 142 is arranged on the link 128 between a portion of the frame and a collar 143 slidable on the link and held in adjusted position by a set screw 144, the spring acting normally to press the link toward the lever 129.

The link 128 is guided at the end adjacent to the arm 141 by means of an angle bracket plate 145, and one end of the spring 142 bears against the said plate.

The operation of the device is as follows: The saws 146 to be gummed are arranged on the mandrel 57, as shown in dotted lines in Fig. 2. The carriage supporting the shafts 69 is released from the rod 104, by means of the set screw 107, so that the sections of the sleeve nut do not engage the threads of the rod. The carriage may now be moved to a position where the wheel 72 of the shaft adjacent to the plate 24 will engage the first saw, that is the saw adjacent to the ratchet wheel 56. The sections of the sleeve nut are now clamped on the rod, and the machine is started by moving the belt 17 to the fast pulley 15. As the shaft 12 rotates, with the parts in the position of Figs. 1 and 2, the shaft 6 will not be driven, the belt 10 being on the loose pulley 8. As the shaft 12 rotates, the wheel 20 is rotated, and for every complete rotation of the wheel 20 the mandrel is rotated a distance corresponding to a single tooth of the saw. The wheel 72 as will be noted from an inspection of Figs. 9 and 15 are shaped to fit the teeth, and after a predetermined number of rotations of each wheel 72 the saws will be advanced a single tooth, to permit the grinding of the next tooth. The number of rotations of the grinding shaft depends, of course upon the connection between the said shafts and the shaft 12. As each tooth is ground, the saws on the mandrels are simultaneously advanced by means of the pawl 55. Once during each complete rotation of the wheel 20 the pitman 33 is reciprocated.

On the inward movement of the pitman the collar 37 will engage the arm 35 and will swing the arm in the direction to move the arm 47 longitudinally inward. When the pitman 33 begins to move outward, the spring 52 forces the arms 35 and 47 outwardly, and the pawl 55 slips over the succeeding tooth into position behind the same. Thus the first saw and the middle saw of the series are ground, every tooth of each saw being subjected to a predetermined number of rotations of the adjacent grinding wheel 72. After the two saws have been ground, that is after every tooth of the two saws have been engaged by the wheels 72, the carriage will be advanced. At every complete rotation of the mandrel, the cam 139 will engage the upturned end 138 of the latch lever 133, and will release the latch lever from the notch of the guard 131. As soon as the lever is released the spring 142 will push the link longitudinally toward the lever 129, thus moving the belt 10 from the loose pulley 8 to the fast pulley 9, and the shaft 6 will commence to rotate, being driven through the pinion 119.

Once during each complete rotation of the gear wheel 117 the pins 120 will engage the star wheel 116, and will rotate the said star wheel and the shaft 104 to which it is secured a complete rotation, and the carriage will be advanced to bring the grinding wheels 72 to the next saws. That is the complete rotation of the rod 104 will move the carriage the distance between the two adjacent saws. As soon as the star wheel and the shaft 104 have been rotated by the pins, and just as the pins are leaving the star wheel, as shown in Fig. 5, the cam 121 will engage the roller 123, and will swing the lower end of the lever 125 in a direction to move the link 128 against the resistance of the spring 142. The link will swing the lever 129, and as the lever passes into the position of Figs. 1, 2, 10 and 11, the latch lever will engage the notch 132, thus locking the lever. The locking of the lever holds the link 128 and the arm 141 from movement, and the movement of the link against the resistance of the spring 142 causes the arm 141 to shift the belt 10 from the fast pulley to the loose pulley; thus releasing the shaft 6. The grinding operation now proceeds as before mentioned until two other saws have been ground completely around, when the mandrel again releases the lever 129, connecting the shaft 6 with the shaft 12, and this series of operations is repeated until every saw of the series has been ground.

It will be evident that a series of saws may thus be quickly ground, every tooth of every saw being treated in turn. As each saw is completed, the movement of the saw releases the spring-operated mechanism which connects the moving means of the carriage to the power shaft. Such moving mechanism is automatically disconnected from the power shaft after the moving of the carriage. Whenever the arm 35 is moved inwardly by the pitman 33, to advance the saws, the lug 88 which is keyed to the shaft 39 to which the arm 35 is secured, will raise the bearing plate 89 of the adjacent shaft 69, and will lift the gumming wheel 72 upwardly, a sufficient distance to prevent engagement of the succeeding tooth with the wheel, during the advancing of the saw. Every time the saws are advanced a single tooth, the gumming wheels are lifted. The frame supporting the gumming wheels moves on the plates 28 and 31. The plate 24 is mounted on the same track rails 28 and 31, but the said plate does not move. The gumming wheels may be nicely adjusted with respect to the saws, by means of the set screws 83, which support the rear ends of carriages 70.

It will be evident that when the set screws are turned in a direction to lower the rear end of the carriage, the gumming wheels will be adjusted away from the teeth, while when the set screws are turned in a direction to raise the rear end of the frame, the gumming wheels will be moved toward the teeth. By means of the set screw 50 the distance traveled by the pawl 55 at each reciprocation of the pitman 33 may be varied. The pin 49 and the slot 48 constitute a lost motion connection between the arms 35 and 47, and the forward movement of the arm 35 is limited by the set screw 44. By means of the nut 25 the wheel 20 may be adjusted vertically.

After a series of saws has been gummed the sleeve nut sections 103 may be released from the rod 104 to permit the carriage to be returned to the original commencing position. By means of the nuts 63 the position of the saws with respect to the plates 70 may be varied. The shafts 69 when they are moved upward by the lugs 86 swing on the bearing lugs 77.

When the pitman 33 begins to move outward, the lever 35 is returned to normal position by the spring 92, operating on the plate 89 through the elements 86 and 39. The spring 52 is for the purpose of preventing the pawl 47 from moving the ratchet wheel more than a single tooth. A brake to be described is provided for engaging the mandrel to prevent excess movement thereof.

The shafts 69 may be adjusted longitudinally to adjust the gumming wheels 72. This adjustment is by means of the collars 78 and the wheels 73. When the set screws 79 and 81 are loosened, the shaft 69 may be moved with respect to the wheels and collar, and the shaft may be clamped in adjusted position by tightening the set screws. The mandrel 57 may be adjusted vertically, by means of the plates 60 which support the bearings 58 and are adjustably connected with the frames. It will be noted from an inspection of Fig. 1 that each of the plates 60 has longitudinally extending slots 61 through which are passed bolts 62, for connecting the plates with the frame. Each bolt is engaged by a nut 63, and it will be evident that by loosening the nuts 63 the plate may be adjusted vertically and may be held in adjusted position by tightening the nuts. The brake above mentioned is merely a movable bearing block 147, which is arranged at one of the bearings 58. Set screws 148 are passed through openings in the block 147, and engage threaded openings in the bearing 58. The coöperating grooves of the bearing 58 and the block 147 form an opening of less diameter than that of the mandrel 57, and it will be obvious that when the set screws 148 are tightened, more or less drag may be placed on the mandrel.

The set screw 50 is a stop for limiting the outward movement of the arm 35, and by means of the said stop the extent of movement of the saws at each reciprocation of the pitman 33 may be varied. It will be obvious that the extent of movement of the mandrel at each stroke of the pitman 33 depends upon the extent of movement of the pawl arm 47. The extent of movement of the pawl arm is dependent upon the extent of movement of the arm 35.

When the series of saws have been gummed, the movement of the plate 70 will throw the belt 10 from the fast pulley 15 to the loose pulley 16, thus stopping the operation of the machine.

I claim:

1. In a saw gummer, a supporting frame, a driving shaft journaled longitudinally of the frame, a carriage movable longitudinally of the frame, a mandrel supported by the frame and adapted to support a series of saws, gumming shafts journaled on the carriage and mounted for upward movement with respect to the carriage at the ends adjacent to the saws, gumming wheels secured to the front ends of the shafts, springs normally acting to hold the front ends of the shafts in lowered position with the gumming wheels engaging the saws, a driving connection between each gumming wheel and the driving shaft, pawl and ratchet mechanism for advancing the mandrel at predetermined intervals and connected to the driving shaft, means operated by the said pawl and ratchet mechanism for lifting the front ends of the gumming shafts when the mandrel is advanced, and means controlled by the rotation of the mandrel for moving the carriage at predetermined intervals.

2. A saw gummer comprising a supporting frame, a driving shaft journaled longitudinally of the frame, a mandrel for supporting a series of saws journaled longitudinally of the frame at the front thereof, a carriage movable on the frame longitudinally of the mandrel, gumming wheels supported by the carriage for simultaneously engaging the saws on the mandrel, pawl and ratchet mechanism operated by the driving shaft for advancing the mandrel at predetermined intervals, the gumming wheels being movable vertically with respect to the carriage, springs pressing the gumming wheels into engagement with the saws, means operated by the pawl and ratchet mechanism when advancing the mandrel for lifting the gumming wheels out of engagement with the saws, and means operated by the mandrel at each complete rotation thereof for moving the carriage a predetermined distance.

3. In a saw gummer, means for supporting a mandrel, a carriage movable longitudinally of the mandrel, gumming wheels journaled on the carriage for engaging saws supported by the mandrel, means for rotating the gumming wheels and for advancing the mandrel at predetermined intervals, means operated by the advancing means for the mandrel for moving the gumming wheels out of engagement with the saws, and means controlled by the rotation of the mandrel for moving the carriage.

4. In a saw gummer, a supporting frame having means for supporting a mandrel carrying a series of saws to be gummed, a carriage movable longitudinally of the frame and of the mandrel and provided with gumming means for gumming the saws, said gumming means being movable vertically with respect to the carriage, springs normally pressing the gumming means toward the saws, means for intermittently advancing the mandrel at predetermined intervals, means for operating the gumming mechanism, and the advancing means for the mandrel, and means operated by the advancing means for advancing the mandrel for moving the gumming wheels out of engagement with the saws.

5. In a saw gummer, a frame having means for supporting a mandrel carrying a series of saws, gumming mechanism movable on the frame longitudinally of the mandrel, means for operating the gumming mechanism and for moving the same longitudinally of the mandrel, said mechanism being mounted to yield upwardly away from the saws, means for advancing the mandrel at predetermined intervals, and means controlled by the said advancing means when advancing the mandrel for moving the gumming mechanism out of engagement with the saws.

6. In a saw gummer a supporting frame having means for supporting a mandrel carrying a series of saws, gumming mechanism movable longitudinally of the mandrel, means for advancing the mandrel at predetermined intervals, and means operated by the advancing means when advancing the mandrel for moving the gumming mechanism out of engagement with the saws.

7. In a gumming machine, a supporting frame, a mandrel journaled longitudinally of the frame and adapted to support a series of saws, gumming mechanism for gumming the saws in succession, and means for advancing the mandrel at predetermined intervals to successively gum the teeth of a saw, said mechanism comprising a table arranged transversely of the frame and adjustable thereon an operating wheel journaled on the table, an arm pivoted on the table at the opposite end from the wheel and having a plurality of transverse openings, a pitman connected at one end with the wheel and extending through the uppermost opening of the arm, a stop on the pitman on the opposite side of the arm from the wheel and adjustable longitudinally of the pitman, an adjustable stop on the table for limiting the outward swinging movement of the arm, a pawl arm extending through the lowermost opening of the first-named arm and having a pawl at its outer end, a ratchet wheel on the mandrel for coöperation with the pawl, said pawl arm being slotted in the opening of the arm, a pivot pin passing through the slot and the arm, a set screw threaded through the rear end of the pawl arm and engaging the pivot pin in the slot, and a coil spring between the head of the set screw and the table, said gumming mechanism being mounted to move vertically away from the saws, and means operated by the swinging movement of the arm toward the wheel for lifting the gumming mechanism.

8. In a gumming machine, a supporting frame, a mandrel journaled longitudinally of the frame and adapted to support a series of saws, gumming mechanism for gumming the saws in succession, and means for advancing the mandrel at predetermined intervals to successively gum the teeth of a saw, said mechanism comprising a table arranged transversely of the frame and adjustable thereon, an operating wheel journaled on the table, an arm pivoted on the table at the opposite end from the wheel and having a plurality of transverse openings, a pitman connected at one end with the wheel and extending through the uppermost opening of the arm, a stop on the pitman on the opposite side of the arm from the wheel and adjustable longitudinally of the pitman, an adjustable stop on the table for limiting the outward swinging movement of the arm, a pawl arm extending transversely of the lowermost opening of the first-named arm and having a pawl at its outer end, a ratchet wheel on the mandrel for coöperation with the pawl, said pawl arm being slotted in the opening of the arm, a pivot pin passing through the slot and the arm, a set screw threaded through the rear end of the pawl arm and engaging the pivot pin in the slot, and a coil spring between the head of the set screw and the table.

9. In a gumming machine, a supporting frame, a mandrel journaled longitudinally of the frame and adapted to support a series of saws, gumming mechanism for gumming the saws in succession, and means for advancing the mandrel at predetermined intervals to successively gum the teeth of a saw, said mechanism comprising a table arranged transversely of the frame and adjustable thereon, an operating wheel journaled on the table, an arm pivoted on the table at the opposite end from the wheel and having a plurality of transverse openings, a pitman connected at one end with the wheel and extending through the uppermost opening of the arm, a stop on the pitman on the opposite side of the arm from the wheel and adjustable longitudinally of the pitman, an adjustable stop on the table for limiting the outward swinging movement of the arm, a pawl arm extending transversely of the lowermost opening of the first-named arm and having a pawl at its outer end, a ratchet wheel on the mandrel for coöperation with the pawl, and means for varying the extent of movement of the pawl.

10. In a gumming machine, a supporting frame, a mandrel journaled longitudinally of the frame and adapted to support a series of saws, gumming mechanism for gumming the saws in succession, and means for advancing the mandrel at predetermined intervals to successively gum the teeth of a saw, said mechanism comprising a table arranged transversely of the frame and adjustable thereon, an operating wheel journaled on the table, an arm pivoted on the table at the opposite end from the wheel and having a transverse opening, a pitman connected at one end with the wheel and extending through the transverse opening of the arm, a stop on the pitman on the opposite side of the arm from the wheel and adjustable longitudinally of the pitman, an adjustable stop on the table for limiting the outward swinging movement of the arm, and a pawl connected with the arm, the mandrel having a ratchet wheel for engagement by the pawl.

11. In a gumming machine, a supporting frame, a mandrel journaled longitudinally of the frame and adapted to support a series of saws, gumming mechanism for gumming the saws in succession, and means for advancing the mandrel at predetermined intervals to successively gum the teeth of a saw, said mechanism comprising a table arranged transversely of the frame and adjustable thereon, an operating wheel journaled on the table, an arm pivoted on the table at the opposite end from the wheel and having a transverse opening, a pitman connected at one end with the wheel and extending through the transverse opening of the arm, an adjustable connection between the pitman and the arm, and a pawl connected with the arm, the mandrel having a ratchet wheel for engagement by the pawl.

FRED STRICKLAND.

Witnesses:
W. R. SUTHERLAND,
J. THOS. BALL.